Jan. 9, 1968   J. P. CONNOLLY   3,362,646
VARIABLE DIRECTION THRUST NOZZLE
Filed Aug. 23, 1965   3 Sheets-Sheet 1

INVENTOR:
JEROME P. CONNOLLY

BY: Edwin D. Grant
ATTORNEY

Jan. 9, 1968   J. P. CONNOLLY   3,362,646

VARIABLE DIRECTION THRUST NOZZLE

Filed Aug. 23, 1965   3 Sheets-Sheet 2

INVENTOR:
JEROME P. CONNOLLY

BY: *Edwin O. Grant*
ATTORNEY

Jan. 9, 1968    J. P. CONNOLLY    3,362,646
VARIABLE DIRECTION THRUST NOZZLE

Filed Aug. 23, 1965    3 Sheets-Sheet 3

INVENTOR:
JEROME P. CONNOLLY

BY: Edwin D. Grant
ATTORNEY

United States Patent Office 3,362,646
Patented Jan. 9, 1968

3,362,646
VARIABLE DIRECTION THRUST NOZZLE
Jerome P. Connolly, Levittown, Pa., assignor to Thiokol Chemical Corporation, Bristol, Pa., a corporation of Delaware
Filed Aug. 23, 1965, Ser. No. 481,457
1 Claim. (Cl. 239—265.35)

ABSTRACT OF THE DISCLOSURE

A rocket motor thrust nozzle mounting and insulating arrangement wherein a thermal insulating member is disposed at the forward end of said thrust nozzle and provided with a spherical periphery which slidably engages a mating surface of a thermal insulating liner disposed at the aft end of said rocket motor.

This invention relates to a rocket motor having a thrust nozzle that can be canted to vary the thrust direction thereof. More particularly, this invention relates to a thrust nozzle and rocket motor casing support structure therefor that can advantageously be incorporated in a rocket motor that is used in an aircraft seat ejection system.

It has been proposed heretofore that the thrust nozzle of a rocket motor used in an aircraft seat ejection system should be designed so that it can be canted relative to the casing of the rocket motor, thus permitting the direction of thrust of the nozzle to be varied after the rocket motor emerges from the launch tube in which it is held prior to use. Thrust nozzles for rocket motors of the type described, which for the sake of brevity will hereinafter be referred to simply as pivotal thrust nozzles, have previously been made of metals, such as molybdenum alloys, that can withstand the high temperature and erosive effects of the propellant thrust gases which pass therethrough. It has been found, however, that pivotal thrust nozzles made of metals such as molybdenum alloys are not completely satisfactory for several reasons. For example, unequal expansion of a metallic pivotal thrust nozzle and its casing support structure can cause sealing surfaces of these components either to bind or separate, both of which consequences are intolerable. Furthermore, pivotal thrust nozzles fabricated of metals such as molybdenum alloys are excessively heavy and expensive to manufacture.

It is therefore an object of this invention to provide a pivotal rocket motor thrust nozzle the forward peripheral surface of which will remain in sealed, slidable contact with its rocket motor casing support structure when high temperature gases pass through the nozzle.

Another object of this invention is to provide a pivotal rocket motor thrust nozzle and casing support structure therefor that can be economically manufactured.

An additional object of this invention is to provide a compact, lightweight pivotal rocket motor thrust nozzle that can be advantageously used in a rocket motor seat ejection system.

Still another object of this invention is to provide a pivotal rocket motor thrust nozzle having wear-resistant and heat-resistant components that are respectively fixedly secured to the forward end of said nozzle in an arrangement which effectively protects the nozzle from the destructive effects of propellant thrust gas and which is simple in design and thus economical to manufacture and easy to assemble.

Other objects and advantages of this invention will become evident in the following description of a preferred embodiment of the invention, in which reference is made to the accompanying drawing, wherein.

Throughout the specification and drawings, like reference numbers refer to like parts.

Figure 1:
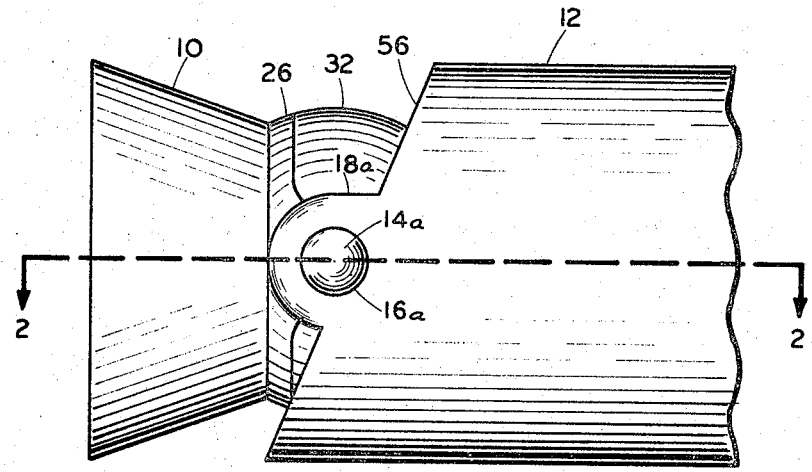
FIGURE 1 is a fragmentary side elevational view illustrating a rocket motor which comprises a thrust nozzle and casing support structure therefor that constitute a preferred form of the invention.
Figure 2:
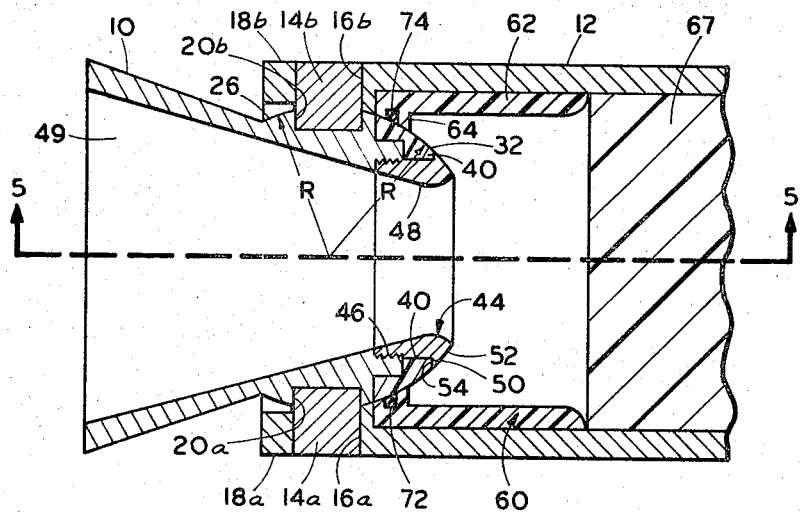
FIGURE 2 is a fragmentary longitudinal cross-sectional view of the rocket motor illustrated in FIG. 1, taken along the plane represented by line 2—2 in that drawing.
Figure 3:
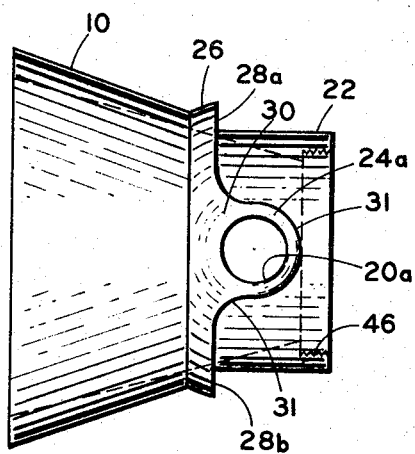
FIGURES 3 and 4 are detail side elevational views respectively illustrating components of the thrust nozzle of the preferred embodiment of the invention.

As illustrated in FIGS. 1 and 2, the thrust nozzle of the preferred embodiment of this invention comprises an expansion cone 10 that is pivotally connected to the aft end of a rocket motor casing 12 by means of two pivots 14a, 14b which are slidably engaged within diametrically opposed apertures 16a, 16b formed in rearwardly extending support portions 18a, 18b of said casing and which are fixedly secured, as by means of a forced fit, within holes 20a, 20b formed in said expansion cone. The axes of apertures 16a, 16b are coincident, intersect the longitudinal axes of expansion cone 10 and casing 12, and are perpendicular to said longitudinal axes of said expansion cone and casing. As can be seen in FIG. 3, expansion cone 10 is provided with a cylindrical forward portion 22, all points on the peripheral surface of said portion 22 being equidistant from the longitudinal axis of said expansion cone. Projecting outwardly from the aft end of portion 22 of the expansion cone and integrally joined thereto are two diametrically opposed pivot support bosses 24a, 24b (only one of which can be seen in FIG. 3) each having a respective one of the holes 20a, 20b formed therein. Expansion cone 10 is also provided with an outwardly projecting and circumferentially extending flange 26 which is located aft of bosses 24a, 24b and integral therewith, said flange having a pair of forward surfaces 28a, 28b that are coplanar and respectively disposed perpendicular to the longitudinal axis of said expansion cone on opposite sides of bosses 24a, 24b. The peripheral surfaces of bosses 24a, 24b and flange 26 are common and, as illustrated in FIG. 2, are spherical, i.e., all points on said surfaces are a distance R from the point of intersection of the axes of holes 20a, 20b with the longitudinal axis of expansion cone 10. Fillets 30 are provided at the junctures of surfaces 28a, 28b of flange 26 with the inwardly extending surfaces 31 that define bosses 24a, 24b respectively.

Figure 4:
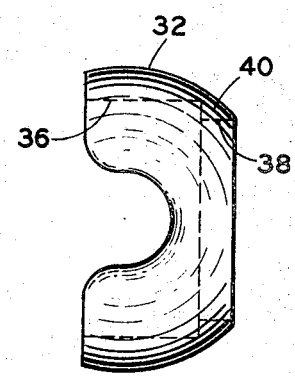

FIGURE 4 is a detail view of an annular insulating member, generally designated by the number 32, which, as can be seen in FIGS. 2 and 4, is disposed around the forward end of expansion cone 10 in abutting relation with surfaces 28a, 28b of flange 26, the inwardly extending surfaces 31 that define bosses 24a, 24b, and the cylindrical surface of portion 22 thereof. As indicated in FIG. 2, the peripheral surface of insulating member 32 is spherical, i.e., all points thereon are a distance R from the point of intersection of the axes of holes 20a, 20b with the longitudinal axis of expansion cone 10. Insulating member 32 includes two holes 36, 38 of different diameter which define an inwardly projecting shoulder 40 which abuts the forward end of expansion cone 10. As illustrated in FIG. 2, expansion cone 10 is also provided with an annular insert, generally designated by the number 44, the aft end of which is fixedly engaged within a threaded hole 46 formed in the forward end of expansion cone 10 and the inner surface 48 of which forms the throat of the thrust nozzle. More particularly, insert 44 projects forwardly from the forward end of expansion cone 10 and its inner surface forms a convergent-divergent throat portion of the orifice 49 of the thrust nozzle assembly. Insert 44 has an integral outwardly extending projection 50 at the forward end thereof, the outer, forward surface 52 of this projection being spherical, i.e., as in the case of the peripheral surfaces of bosses 24a, 24b, flange 26 and insulating member 32, all points thereon are a distance R from the points of intersection of the axes of holes 20a, 20b with the longitudinal axis of expansion cone 10. Insert 44 is screwed into the threaded hole 46 in expansion cone 10 to bring the rear surface 54 of projection 50 thereof into engagement with the forward end surface of insulating member 32, thus locking the inwardly projecting shoulder 40 of said insulating member between said projection 50 and the forward end surface of said expansion cone.

Figure 5:
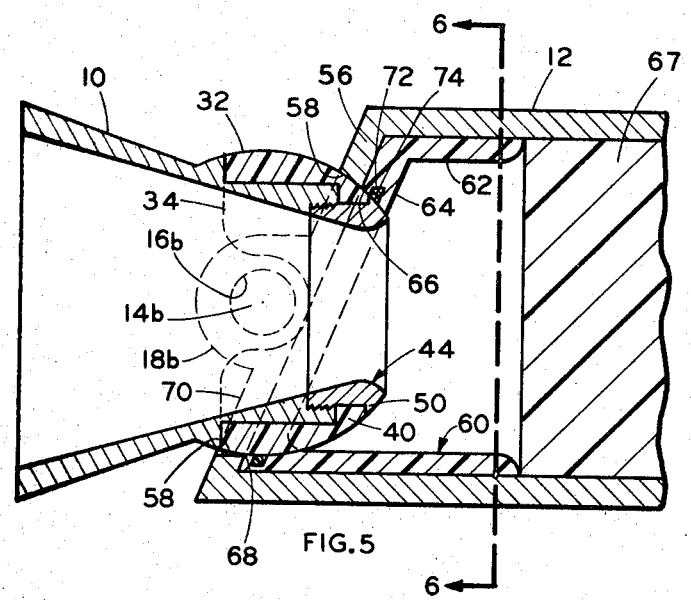
FIG. 5 is a fragmentary longitudinal cross-sectional view of the rocket motor illustrated in FIG. 1, taken along the plane represented by line 5—5 in FIG. 2.
Figure 6:
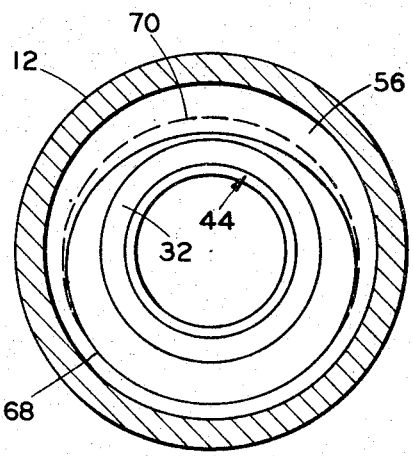
FIGURE 6 is a cross-sectional view of the rocket motor illustrated in FIG. 1, taken along the plane represented by line 6—6 of FIG. 5, with one component of the preferred embodiment removed for clarity.

As can be seen in FIG. 5, casing 12 is provided with an end closure 56 which is oblique to the longitudinal axis of casing 12 and which has a aperture 58 therein. Also illustrated in FIG. 5 is an insulating liner, generally designated by the number 60, which comprises a first cylindrical portion 62 the peripheral surface of which abuts the inner surface of casing 12 and a second integral, inwardly extending portion 64 the rear surface of which abuts the inner surface of end closure 56. Insulating liner 60 also has an aperture 66 formed therein, the rear edge of this aperture being coterminous with the forward edge 68 of aperture 58 in end closure 56, and the forward end of said insulating liner being disposed adjacent the end surface of the solid propellant grain 67 of the illustrated rocket motor. The peripheral surface of insulating member 32 is slidably engaged with the walls of apertures 58 and 66 respectively. However, as can be seen in FIG. 5, since end closure 56 is oblique to the longitudinal axis of casing 12, the forward portion of insulating member 32 contacts the portions of apertures 58 and 66 that are uppermost in the drawing, whereas the rear portion of said insulating member contacts the portions of apertures 58 and 66 that are lowermost in the drawing. Thus the curvatures of the walls of apertures 58 and 66 are not the same at all points thereon, and portion 64 of insulating liner 60 is not coextensive with end closure 56. In FIG. 6, wherein insulating liner 60 is removed so that end closure 56 can be seen, the position of aperture 58 relative to the wall of casing 12 is illustrated in cross-sectional view, with the forward edge 68 of said aperture appearing as a solid line in this drawing and the rear edge 70 of said aperture appearing as a broken line therein. As illustrated in both FIGS. 2 and 5, a circumferentially extending groove 72 is formed in the wall of aperture 66 in insulating liner 60, and an O-ring 74 is positioned within this groove.

In the preferred embodiment of the invention, expansion cone 10, casing 12 and pivots 14a, 14b are formed of steel. Insert 44, the forward end surface 52 and inner surface of which protect the portions of the thrust nozzle that would otherwise be most severly eroded by the abrasive particles entrained in some propellant thrust gases, is formed of a suitable hard metal such as an alloy of molybdenum or tungsten. Insulating member 32 and insulating liner 60 are made of a hard, thermal-insulating material, such as the products supplied by the Panelyte Division of Thiokol Chemical Corporation under their designations RAP–1051 and MX4925, these materials comprising a graphite cloth impregnated with phenolic resin. Insulating member 32 is preferably bonded to expansion cone 10 and insert 44 by means of epoxy adhesive, which is also used to bond insulating liner 60 to the inner surfaces of casing 12 and its end closure 56 respectively. O-ring 74 is formed of a suitable elastomeric material such as silicone rubber.

It will be recognized by inspection of FIG. 5 that the thrust nozzle of the preferred embodiment of the invention can be canted from the illustrated position thereof to a position wherein projection 50 of insert 44 is disposed adjacent the portion of O-ring 74 that is lowermost in the drawing. Throughout this pivotal movement of the thrust nozzle, which can be effected by various types of cam means associated with a launch tube in which casing 12 is initally positioned, insulating member 32 and insulating liner 60 remain in slidable engagement and do not either bind or separate even when high-temperature thrust gas generated by combustion of grain 67 passes through the thrust nozzle. This advantageous result is achieved because of several features of the construction and arrangement of the components of the described and illustrated preferred embodiment of the invention, one of which is the shielding of metallic portions of the thrust nozzle and its casing support structure from direct contact with thrust gases containing particles, such as the powdered aluminum incorporated in many solid propellants, that either erode surfaces of a thrust nozzle and its casing support structure so that they will not be sealed in the canted position of the thrust nozzle or, in some instances, adhere to said surfaces so that they will bind instead of freely sliding relative to each other. Furthermore, insulating member 32 and insulating liner 60 limit heat flow to the portions of the thrust nozzle and casing support structure that are in slidable engagement throughout the firing of the rocket motor, namely, pivots 14a, 14b and the portions of casing 12 adjacent thereto. Thus the expansion of these components during the operaton of the rocket motor is minimized. Since the sealing surfaces of the ball and socket joint of the thrust nozzle and casing are formed on components, namely insulating member 32 and insulating liner 60, which are made of a material having a low coefficient of thermal expansion, this feature cooperates with the aforementioned minimal expansion of metallic portions of the thrust nozzle and casing that are in slidable engagement to eliminate the problems of binding or separation of sealing surfaces that occur in the use of prior art pivotal thrust nozzles and their casing support structures. Another advantage of the preferred embodiment of the invention is that its construction does not require a large amount of an expensive metal, insert 44 being employed at the point where erosion of the thrust nozzle would generally occur and the arrangement of this insert, insulating member 32 and insulating liner 60 permitting the use of an ordinary structural metal, such as steel or aluminum, in the fabrication of the major portion of the thrust nozzle-casing support assembly.

It will be recognized that certain changes may be made in the construction and arrangement of the illustrated and described thrust nozzle and casing support structure without departing from the spirit and scope of the invention. For example, O-ring 74 may be placed in a groove formed in the wall of aperture 58 rather than in the indicated location. Insulating member 32 may also be molded on expansion cone 10 and its peripheral surface then machined to the required shape. Therefore the invention is to be limited only by the terms of the claim appended hereto.

What is claimed is:
1. In a rocket motor, the combination comprising:
a casing having an aft end closure with an aperture therein, a pair of diametrically opposed apertures being formed in said casing adjacent the aft end thereof;
an expansion cone having a cylindrical forward portion, a pair of diametrically opposed pivot support bosses projecting outwardly from the rear of said cylindrical forward portion, and an outwardly projecting, circumferentially extending flange aft of said bosses, each of said bosses having a hole therein, the peripheral surfaces of said bosses and said flange being spherical;
a pair of pivots each slidably engaged with a respective one of said diametrically opposed apertures in said casing and fixedly secured within a respective one of said holes in said bosses;

an insulating member disposed around said cylindrical forward portion of said expansion cone, the peripheral surface of said insulating member being spherical and slidably engaged with the wall of said aperture in said aft end closure, said insulating member abutting the forward surfaces of said bosses and including an inwardly projecting shoulder that abuts the forward end of said expansion cone;

an insert fixedly secured to the forward end of said expansion cone, the inner surface of said insert forming the throat of said expansion cone, said insert having at the forward end thereof an inwardly extending projection the outer, forward surface of which is spherical and the rear surface of which abuts the forward end of said insulating member; and an insulating liner having a first cylindrical portion the peripheral surface of which abuts the inner surface of said casing and a second inwardly extending portion the rear surface of which abuts the inner surface of said aft end closure, said insulating liner having an aperture centrally formed therein, the peripheral surface of said insulating member being slidably engaged with the wall of said aperture in said insulating liner.

References Cited

UNITED STATES PATENTS

| | | | |
|---|---|---|---|
| 3,048,977 | 8/1962 | Geary | 239—265.35 |
| 3,230,708 | 1/1966 | Huang et al. | 60—232 |
| 3,280,563 | 10/1966 | Bowersett | 239—265.35 |
| 3,282,161 | 11/1966 | MacDonald et al. | 60—232 X |

FOREIGN PATENTS 875,205  8/1961  Great Britain.

M. HENSON WOOD, Jr, *Primary Examiner.*

VAN C. WILKS, *Assistant Examiner.*